United States Patent
Agarwal et al.

(10) Patent No.: US 11,059,948 B2
(45) Date of Patent: Jul. 13, 2021

(54) SHAPE MEMORY-BASED SELF-HEALING POLYMER COMPOSITE REINFORCED WITH GRAPHENE FOAM

(71) Applicants: Arvind Agarwal, Miami, FL (US); Benjamin Boesl, Miami, FL (US); Adeyinka Idowu, Miami, FL (US); Pranjal Nautiyal, Miami, FL (US); Jenniffer Bustillos, Miami, FL (US)

(72) Inventors: Arvind Agarwal, Miami, FL (US); Benjamin Boesl, Miami, FL (US); Adeyinka Idowu, Miami, FL (US); Pranjal Nautiyal, Miami, FL (US); Jenniffer Bustillos, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/421,562

(22) Filed: May 24, 2019

(65) Prior Publication Data
US 2020/0369842 A1 Nov. 26, 2020

(51) Int. Cl.
*C08J 5/24* (2006.01)
*C08G 59/24* (2006.01)
(Continued)

(52) U.S. Cl.
CPC .............. *C08J 5/24* (2013.01); *C01B 32/194* (2017.08); *C08G 59/245* (2013.01); *C08G 59/5006* (2013.01); *C08G 59/506* (2013.01); *C08G 59/5033* (2013.01); *C08G 59/5073* (2013.01); *C08K 3/013* (2018.01);
(Continued)

(58) Field of Classification Search
CPC . C08J 5/24; C08J 9/35; C08J 2363/00; C08K 3/013; Y10T 428/249956; Y10T 428/249986; Y10T 428/249955; C01P 2004/03; C08G 2280/00
See application file for complete search history.

(56) References Cited

U.S. PATENT DOCUMENTS 7,824,651 B2 * 11/2010 Zhamu ................ C01B 32/225
252/378 R
8,101,689 B2 1/2012 Tong et al.
(Continued)

FOREIGN PATENT DOCUMENTS

CN 104194275 A * 12/2014
CN 106987112 A * 7/2017

OTHER PUBLICATIONS

Translation of CN 104194275, Cao Wenwu, Dec. 10, 2014. (Year: 2014).*
(Continued)

*Primary Examiner* — Hai Vo
(74) *Attorney, Agent, or Firm* — Saliwanchik, Lloyd & Eisenschenk (57) ABSTRACT

A shape-memory epoxy polymer graphene foam composite (SMEP-GrF) is formed from an open cell graphene foam (GrF) surrounded by and infiltrated with a shape-memory epoxy polymer (SMEP) matrix, with the GrF being an intra-connected framework within the SMEP matrix. The SMEP-GrF provides self-healing properties to a device fabricated from the SMEP-GrF. The SMEP-GrF is formed by infusion of an epoxy resin and hardener in an open cell GrF and curing the infused GrF.

12 Claims, 6 Drawing Sheets

(51) Int. Cl.
    *C08G 59/50*     (2006.01)
    *C01B 32/194*     (2017.01)
    *C08K 3/013*     (2018.01)
    *C08J 9/35*     (2006.01)

(52) U.S. Cl.
    CPC ...... *C01P 2004/03* (2013.01); *C08G 2280/00* (2013.01); *C08J 9/35* (2013.01); *C08J 2363/00* (2013.01); *C08K 2201/001* (2013.01); *C08K 2201/005* (2013.01); *Y10T 428/249955* (2015.04); *Y10T 428/249956* (2015.04); *Y10T 428/249986* (2015.04)

(56) References Cited

U.S. PATENT DOCUMENTS

| | | | |
|---|---|---|---|
| 8,618,238 | B2 | 12/2013 | Xie et al. |
| 2008/0048364 | A1* | 2/2008 | Armeniades ............ B29B 9/10 264/328.1 |
| 2014/0141224 | A1* | 5/2014 | Pasquali ............ C04B 41/4869 428/219 |
| 2016/0244577 | A1* | 8/2016 | Zhang ................ C08G 59/686 |
| 2017/0069404 | A1* | 3/2017 | Hong .................... H01B 1/04 |
| 2017/0237075 | A1* | 8/2017 | Pedros ................ C04B 35/522 429/241 |

OTHER PUBLICATIONS

Leslie Embrey, "Three-Dimensional Graphene Foam Reinforced Epoxy Composites" Florida International University Electronic Theses and Dissertations, Mar. 27, 2017. (Year: 2017).*

Jia et al. (Jia), "Exceptional Electrical Conductivity and Fracture Resistance of 3D Interconnected Graphene Foam/Epoxy Composite," American Chemical Society, 2014, vol. 8, No. 6, 5774-5783. (Year: 2014).*

Translation of CN 106987112, Chen et al., Jul. 28, 2017. (Year: 2017).*

Tang et al., "Fullerene-Regulated Graphene Oxide Nanosheet Membranes with Well-Defined Laminar Nanochannels for Precise Molecular Sieving", J. Matter.Chem. A. 2018 6 22590-22598. (Year: 2018).*

Yu et al., "Fullerene-Grafted Graphene for Efficient Bulk Heterojuction Polymer Photovoltaic Devices", J. Phys. Chem. Lett. 2011 2 1113-1118. (Year: 2011).*

Tiffany Williams et al., Effect of Graphene Addition on Shape Memory Behavior of Epoxy Resins, ASRC Aerospace, Cleveland, OH, Oct. 17, 2011.

Jozsef Karger-Kocsis et al., Review of Progress in Shape Memory Epoxies and Their Composites, MDPI Polymers, 2018, 10, 34.

Marta Fejos, Development of Epoxy Resin-Based Shape Memory Polymer Composites, Budapest University of Technology and Economics,Thesis booklet, 2015, Budapest.

* cited by examiner

SHAPE MEMORY-BASED SELF-HEALING POLYMER COMPOSITE REINFORCED WITH GRAPHENE FOAM

STATEMENT OF GOVERNMENT SUPPORT

This invention was made with government support under Grant No. W911NF-15-1-0458 awarded by the Air Force Office of Scientific Research. The government has certain rights in the invention.

BACKGROUND

Polymeric materials have been widely used in devices and coatings, where the materials may experience mechanical, chemical, radiative, thermal and other stress. These stresses lead to damage that range from large wounds to microcracks that can be difficult to detect and not readily repairable. The aesthetic qualities of the material can be compromised and the function lifetime of the device can be diminished. To address this problem, materials that can recover mechanical properties are advantageous. A self-healing polymer (SHP) has the potential to repair a wound and prevent crack propagation at the micro scale. To achieve self-healing, incorporation of micro-encapsulated uncured resin as a homogeneously distributed filler phase has been employed where fracture of the encapsulant of the microcapsules releases resin whose polymerization repairs the fracture. Often a catalyst is in the polymer phase but is immobile or impermeable to the capsules. In a second approach, reversible bonds are included in the self-healing polymeric material, where the reversible bonds allow local remodeling of the damaged material.

Shape memory polymers (SMPs) and their composites are emerging smart materials. SMPs may adopt one, two, or several stable temporary shapes and recover their original shape upon the action of an external stimulus. The external stimulus is often temperature responsive, although chemical, radiation, and mechanical stimuli can be employed. Thermosensitive transformations of the SMP from a temporary shape to the permanent shape is commonly linked with the polymers glass transition (Tg) or melting temperature, although liquid crystallization/melting, super-molecular assembly/disassembly, or reversible network formation may be employed for the transformation. The permanent shape is defined by physical entanglements, interpenetrating networks, or chemical networks. Temporary shapes are set by mechanical deformation above the transformation temperature followed by fixing at a temperature below the transformation temperature while being mechanically constrained to the deformed shape. For thermosets, such as epoxies (EP), the transformation temperature is the Tg. During deformation shaping, segments between crosslinks adapt to the external load via conformational rearrangements, which imposes a stored strain energy that is released when the material is heated to restore the permanent shape.

EP SMPs, or SMEPs, are common due to their good heat and chemical resistance, high stiffness, and adhesion to a variety of substrates. Additionally, EPs have a tunable Tg and stiffness in the glassy and rubbery states. One manner to adjust the Tg is to control the EP's precursor resin/hardener ratio in the formulation, where off-stoichiometric ratios results in reduced Tg values. Typically, less hardener than required for 1:1 stoichiometric is used. For example, Tg values between 45 and 145° C. result using bisphenol A-based bifunctional EPs cured with aromatic diamine when the ratio is changed from 2:1 to 1:1. However, it is common to employ a 1:1 ratio and manipulate the network structure in other manners. A common approach is to employ mono- and difunctional amines as the hardener where the chain length of aliphatic monofunctional amines is sufficiently long to form a van der Waals associated physical crosslinking in addition to the chemical crosslinking attributed to the difunctional amines. For anhydride-cured SMEPs, known as vitrimer chemistry, the crosslinked networks include exchangeable chemical bonds. In an anhydride and acid-cured EP system, often referred to as an associative variation, catalytic carboxylate transesterification reactions define the temperature of plasticity, Tp, that linked with the exchange reaction, where the Tp may be above or below the Tg, with the permanent shape being generated at or above Tp and fixed by cooling below Tp. The temporary shape is found between Tg and Tp. A dissociative variation is represented by inclusion of thermally reversible Diels-Alder (DA) units within the EP. For example DA adducts from furan and maleimide groups, which couple below 90° C. and decouple above 110° C., permit good SMEPs that can be exploited for complex shape manipulation having elastic chain segments controlled by the plasticity controlled by DA reversible bonds. By inclusion of the reversible bonding and the physical crosslinking, self-healing properties also can be enhanced with these SMEPs.

SMEPs have been used as the matrix for composites. Fillers have included glass fibers, carbon black microparticles, SiC nanoparticles, carbon nanofibers, unidirectional carbon fiber fabrics, carbon nanofiber "bucky" paper, carbon nanotubes, and graphene platelets. "Bucky" paper allowed the uniform distribution of the nanotubes into a framework followed by infiltration of the procured epoxy into the framework. The equivalent nanotube composite is nearly impossible to achieve by dispersion of the carbon nanotubes or other high aspect particulates, which tend to aggregate and resist random diffusion into a network. The expensive "bucky" paper with carbon nanotubes allowed an excellent heat conductivity to promote rapid thermal transformations in the SMP composite. Graphene flake-SMEP nanocomposite's deformation strain and stress are more consistent between cycle of deformation and recovery than are those of the SMP alone. However, higher strain and reduced stress values of the composites relative to the unfilled SMP suggest that the graphene sheets provided resin toughening rather than resin reinforcement. To address these mechanical or economic shortcomings, frameworks that allow thermal conductivity which are flexible and provide enhanced mechanical strength at low filler loadings are desirable.

BRIEF SUMMARY

An embodiment of the invention is directed to a shape-memory epoxy polymer graphene foam composite (SMEP-GrF) where an open cell graphene foam (GrF) is surrounded by and infiltrated with a shape-memory epoxy polymer (SMEP) matrix. The GrF is an intra-connected framework within at least a portion of the SMEP matrix. The GrF can be 0.1 and 1 wt % of the SMEP-GrF. The SMEP-GrF can provide self-healing properties to the SMEP-GrF. The SMEP-GrF is electrically conductive and thermally conductive. The SMEP-GrF can also include one or more particulate fillers (e.g., microparticles and/or nanoparticles) that reside throughout the entire matrix of the SMEP when the cells of the open cell GRF have cross-sections that are larger than the microparticles and/or nanoparticle fillers. Microparticles and nanoparticles that can be use include fullerenes, graphene platelets, metal oxide particles, metal particles, polymeric particles, or any combination thereof.

An embodiment of the invention is directed to devices that are based on the SMEP-GrF. Among the devices are reconfigurable rotor blades, spoilers, or ailerons for aeronautic applications.

Another embodiment of the invention comprises the preparation of the SMEP-GrF by infiltrating a GrF with a fluid comprising an epoxy resin and hardener that form the SMEP and curing the fluid to form the SMEP-GrF. Infiltration is carried out at a temperature of 25 to 125° C. and at a pressure of 1 atmosphere or less. The subsequent curing to the SMEP-GrF is performed at a temperature equal to or greater than the infiltration temperature and greater than the $T_g$ of the SMEP. The open cell GrF can be a single piece or can be a plurality of pieces. A plurality of pieces can be randomly percolating through the SMEP matrix or a continuous association of complementary shaped and macroscopically matched pieces to form a quasi-continuous GrF framework. The fluid used for infiltration can include particles (e.g., microparticles and/or nanoparticles) that have hydrodynamic diameters that are less than the cross-section of the cells of the open cell GrF. The epoxy resin and/or hardener can have units that promote thermally reversible or exchangeable physical associations or thermally reversible or exchangeable chemical bonding. In this manner van der Waals interactions, polar interactions, hydrogen bonding, ion-pairing, trans-esterification, reversible Diels-Alder addition, or any combination thereof can enhance the self-healing properties of the SMEP-GrF.

DETAILED DESCRIPTION

Embodiments of the invention are directed to composites that couple the self-healing behavior of a shape memory epoxy polymer SMEP with graphene foam (GrF) as a three-dimensional (3D) flexible and strengthening continuous framework. The framework insures a homogenous dispersion of the filler within at least a portion of the SMEP matrix, which resolves the challenge of non-uniform distributions inherent to one-dimensional (nanotube or nanofiber) of two-dimensional (graphene flake) carbon reinforcement. The 3D architecture of GrF provides thermal conductivity, electrical conductivity, and stress transfer within the SMP epoxy matrix. GrF has ultralow density of 4 mg/cm$^3$, a high thermal (2000-4000 W/mK), and an electrical conductivity (10$^6$ S/m). The multifunctional properties provided by the GrF accelerates self-healing of the SMEP-GrF, which can be employed as efficient healable device for aircraft, automotive, electronics, and several other applications when having an appropriate SMEP compositions.

Figure 1A:
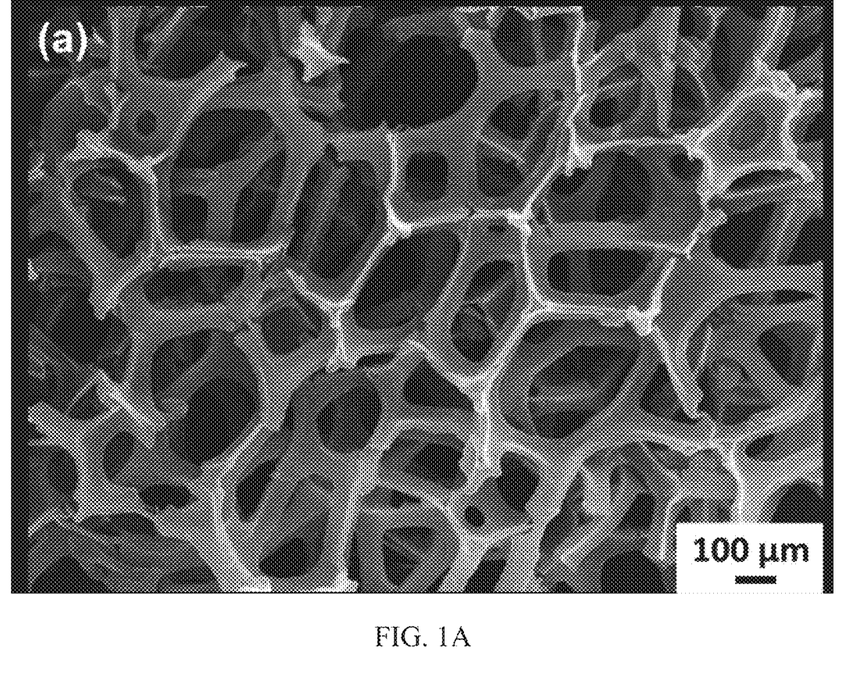
FIG. 1A shows a SEM micrograph of a surface of the GrF employed in examples of the SMEP-GrF, according to embodiments of the invention.
Figure 1B:
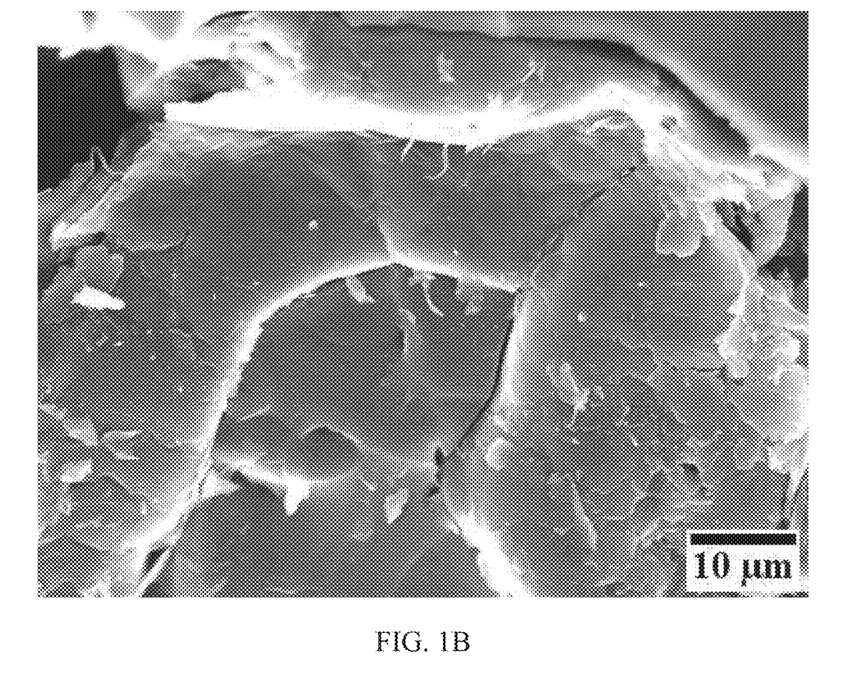
FIG. 1B shows a SEM micrograph of a surface of the SMEP-GrF, according to embodiments of the invention, showing the continuous matrix of the SMEP through the open-cells of the GrF framework in an exemplary SMEP-GrF.
Figure 2:
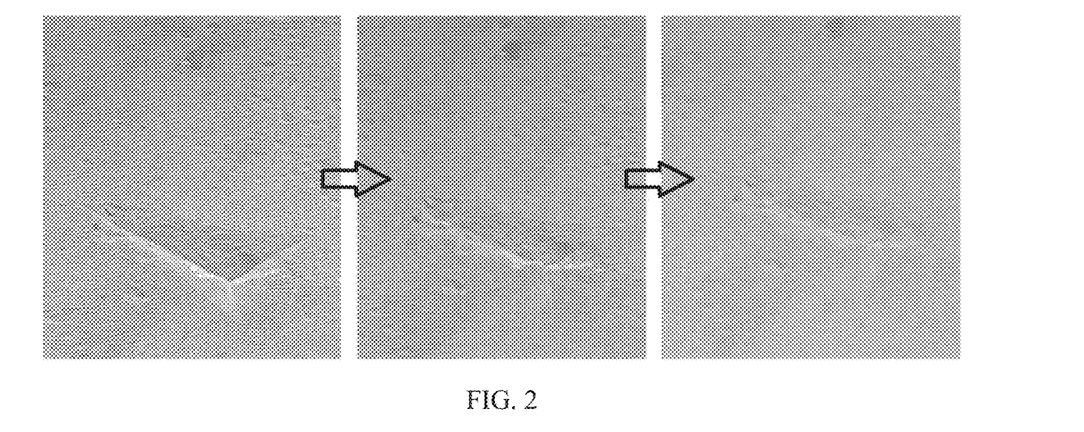
FIG. 2 shows a series of SEM images of a nano-indented SMEP-GrF where consecutive images from left to right are at 25, 50 and 70° C. and demonstrate the self-healing of the indention in the SMEP-GrF, according to embodiments of the invention.

The SMEP-GrF composites, according to an embodiment of the invention, provides thermal and electrical conductive network derived from the GrF, as shown in FIG. 1A, upon the infusion of the SMEP through the open cells of the GrF, as shown in FIG. 1B, where the SMEP percolates throughout and around the GrF framework. The SMEP-GrF displays self-healing at the microscopic scale, as shown in FIG. 2 for the healing of a nano-indentation of an exemplary SMEP-GrF. The composition of the SMEP can be of any EP network that is known or can be anticipated by one of ordinary skill in the art to display shape memory properties. Epoxies, that alone or combination, can be used to form the SMEP include, but are not limited to, diglycidyl ethers of: resorcinol; hydroquinone; 4,4'-isopropylidene bisphenol (bisphenol A); bis(4-hydroxyphenyl)-2.2-dichloroethylene (bisphenol C); bis(4-hydroxy-phenyl)methane (bisphenol F); 4,4'-sulfonyldiphenol (bisphenol S); 4,4'-dihydroxybiphenyl, 4,4'-dihydroxybenzophenone (bisphenol K); 4,4'-(9-fluorenylidene)-diphenol; 9,9-bis[4-(2-hydroxyethoxy)phenyl]fluorene: 4,4'-dihydroxydiphenylethylmethane; 3,3'-dihydroxydiphenyldiethyl-methane; 3,4'-dihydroxydiphenylmethylpropylmethane; 4,4'-dihydroxydiphenyloxide; 4,4'-dihydroxy-diphenylcyanomethane; 4,4'-dihydroxydiphenyl sulfide; 2,6-dihydroxynaphthalene; 1,3-dihydroxynaphthalene; 1,5-dihydroxynaphthalene; 1,6-dihydroxynaphthalene; 1,7-dihydroxynaphthalene; 2,7-dihydroxynaphthalene; catechol; 1,4-butanediol; 1,4-cyclohexanedimethanol; 1.2-cyclohexanedimethanol; 1.6-hexanediol; neopentylglycol; and ethylene glycol.

Amine reagents that can be used as a hardener to form the SMEP include, but are not limited to, 2-amino-3-picoline, 2-amino-6-picoline, 2-aminopyridine, 3-aminopyridine, 4-aminophenol, 2-aminothiazole, 8-aminoquinoline, 8-naphthylamine, ethanolamine, o-anisidine, 2-(2-aminoethoxy)ethanol, benzylamine, propylamine, piperazine and substituted piperazines, e.g., 2-(methylamido)piperazine, 2-methylpiperazine, 2,5-dimethylpiperazine, 2,6-dimethylpiperazine, aniline and substituted anilines, e.g., 4-(methylamido)aniline, 4-methoxyaniline (p-anisidine), 3-methoxyaniline (m-anisidine), 2-methoxyaniline (o-anisidine), 4-butylaniline, 2-sec-butylaniline, 2-tert-butylaniline, 4-sec-butylaniline, 4-tert-butylaniline, 5-tert-butyl-2-methoxyaniline, 3.4-methoxyaniline, 3,4-dimethylaniline, alkyl amines and substituted alkyl amines, e.g., propylamine, butylamine, tert-butylamine, sec-butylamine, benzylamine; alkanolamines, e.g., 2-aminoethanol and 1-aminopropan-2-ol, and aromatic and aliphatic secondary diamines, e.g., 1,4-bis(methylamino)benzene, 1.2-bis(methylamino)ethane, and N,N'-bis(2-hydroxyethyl)ethylene-diamine, N,N'-dibenzylethylenediamine and other aromatic amines, e.g., 2-aminobenothiazole, 3-amino-5-methylpyrazole, 2-amino-6-methylpyridine, 3-aminophenol, 2-amino-3-picoline, 4-aminopyridine, 3-aminopyridine, 2-aminopyridine, 3-aminoquinoline, 5-aminoquinoline, and 2-aminothiophenol. Multifunctional cross-linking reagents that can be incorporated into the hardener include tris(2,3-epoxy-propyl)isocyanurate, glycerol propoxylate triglycidyl ether, 3.5-diethyltoluene-2,4-diamine and 3,5-diethyltoluene-2,6-diamine, methylenedianiline, diethylenetriamine, and tris(2-aminoethyl)-amine.

The network matrix can be one that displays a desirable Tp or Tg, such that devices comprising the SMEP-GrF, according to an embodiment of the invention. The Tg or Tp, can be from temperature that are slightly elevated relative to the use temperature, for example, normal room temperature of about 25° C., to temperature in excess of, for example, less than or equal to 180° C., that is below the thermal decomposition temperature of the SMEP.

Figure 3A:
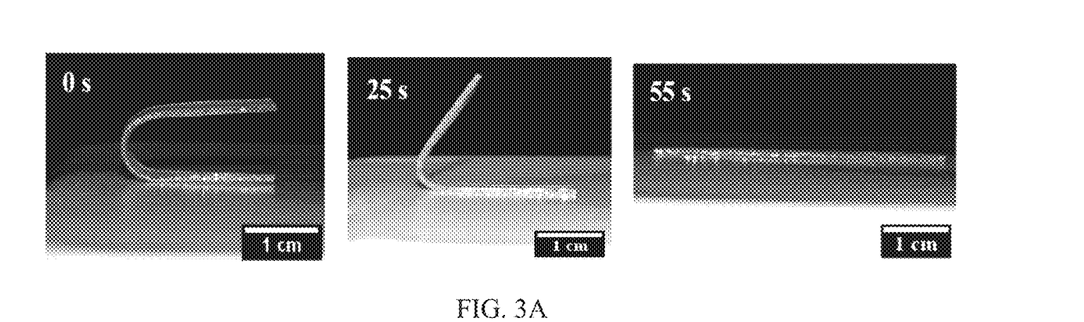
FIG. 3A shows a series of photographs of an exemplary SMEP as it transforms from its deformed state to the permanent state after placement of the SMEP directly onto a hot plate.
Figure 3B:
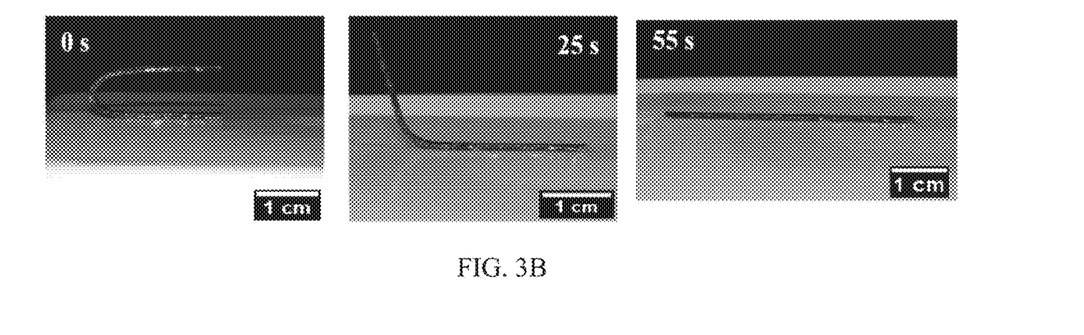
FIG. 3B shows a series of photographs of an exemplary SMEP-GrF, according to an embodiment of the invention, having an SMEP matrix, formed from the same resin as the SMEP of FIG. 3A, where the series displays the transformation from a deformed state to its permanent state after placement of the SMEP-GrF directly onto a hot plate.
Figure 4:
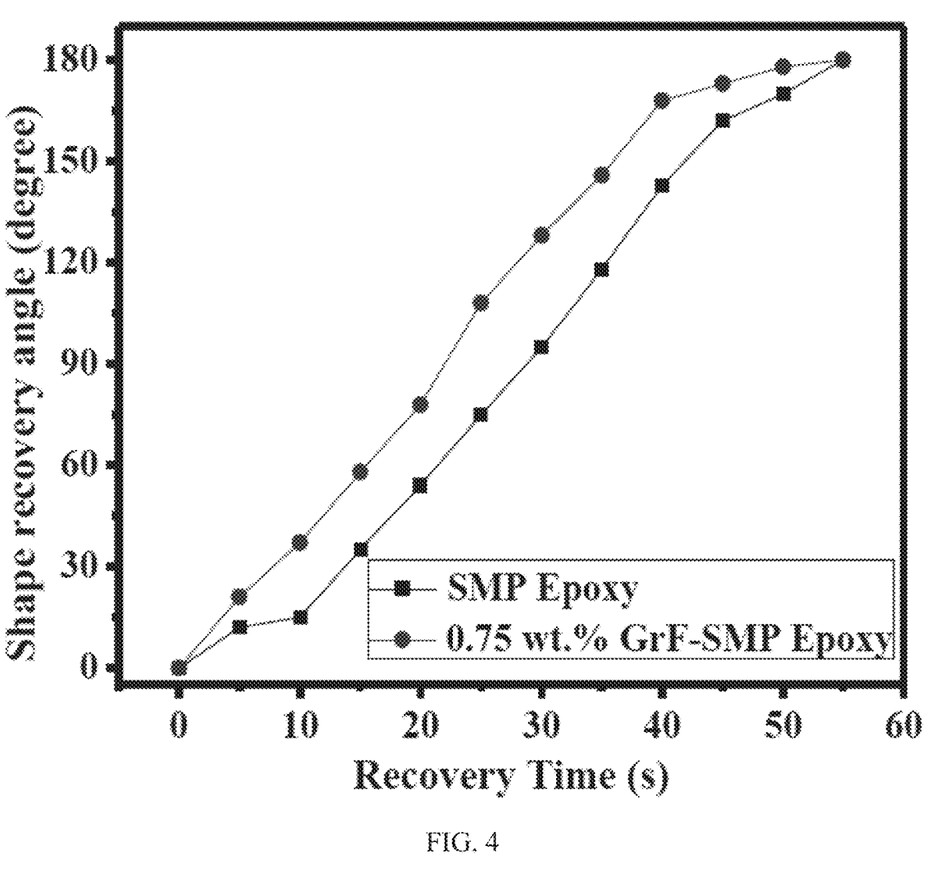
FIG. 4 is a plot of the angle of the deflection over time for the SMEP of FIG. 3A and the SMEP-GrF, according to an embodiment of the invention, of FIG. 3B for the transformation from deformed states to their permanent states.
Figure 5A:
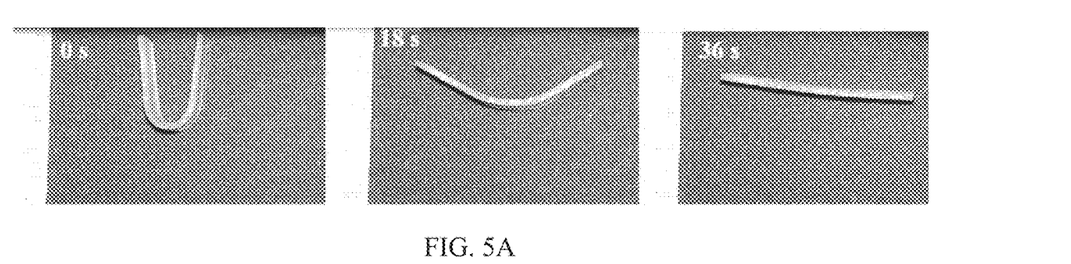
FIG. 5A shows a series of photographs of an exemplary SMEP as it transforms from a deformed state to its permanent state upon heating the SMEP with hot air.
Figure 5B:
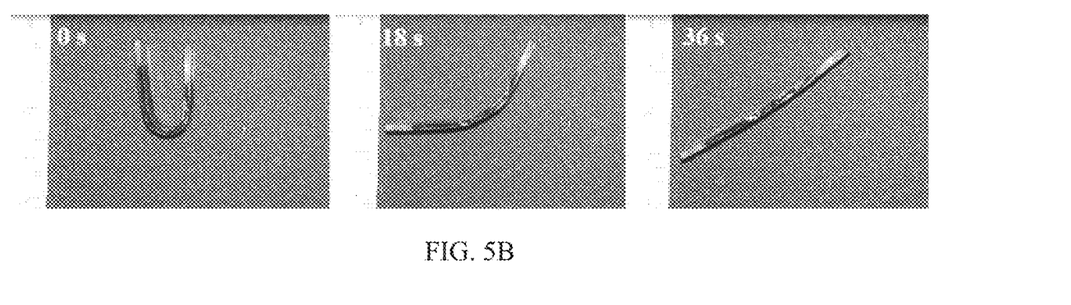
FIG. 5B shows a series of photographs of an exemplary SMEP-GrF, according to an embodiment of the invention, having an SMEP matrix formed from the same resin as the SMEP of FIG. 3A, as it transforms from a deformed state to its permanent state after heating the SMEP-GrF with hot air.
Figures 6A, 6B, 6C:
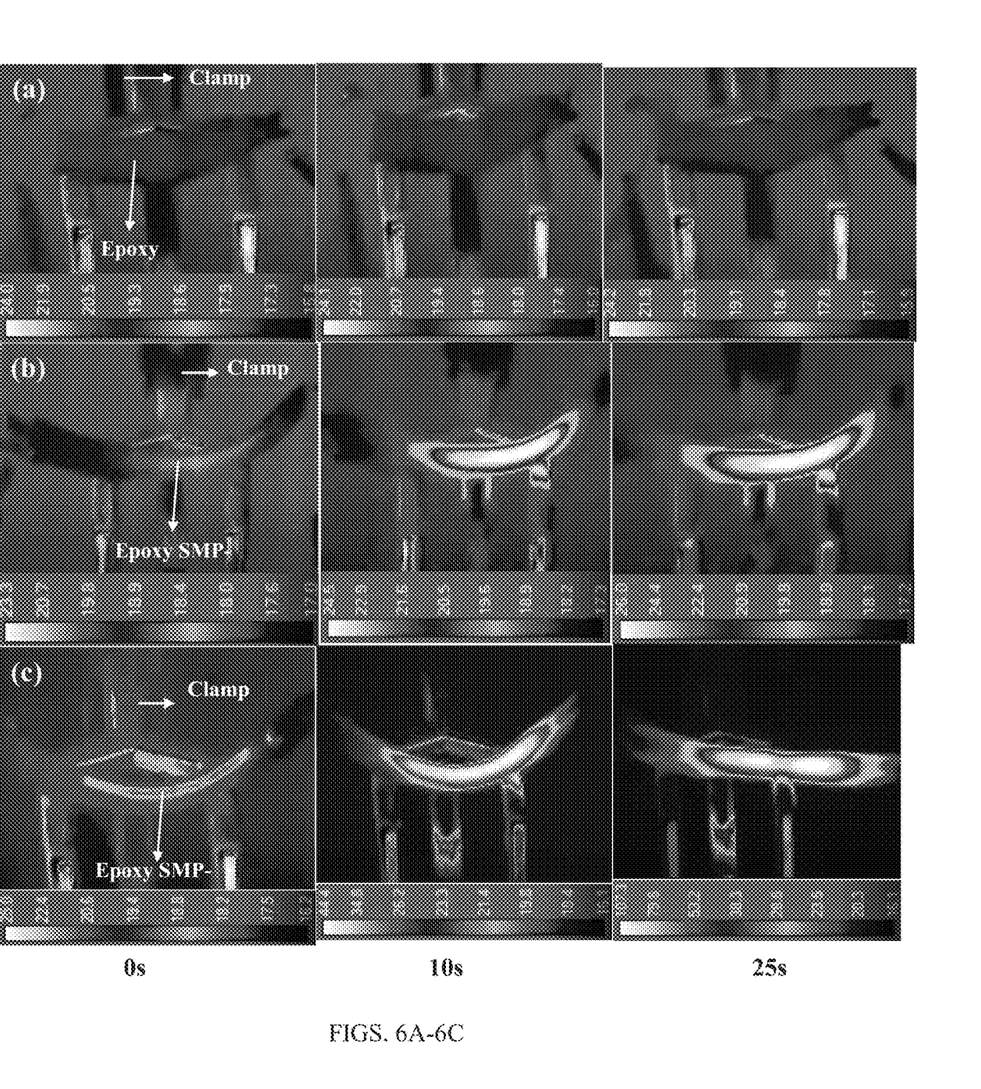
FIG. 6A shows a series of thermal images of a SMEP at room temperature over a period of 25 seconds while imposing a current of 400 mA, where the temperature remains at about room temperature.
FIG. 6B shows a series of thermal images of a SMEP-GrF, according to an embodiment of the invention, having an SMEP matrix formed from the same resin as the SMEP of FIG. 6A, supported at room temperature over a period of 25 seconds while imposing a current of 200 mA, where the temperature increases significantly.
FIG. 6C shows a series of thermal images of a SMEP-GrF, according to an embodiment of the invention, having an SMEP matrix formed from the same resin as the SMEP of FIG. 6A, supported at room temperature over a period of 25 seconds while imposing a current of 400 mA, where the temperature increases significantly.
Figure 7A:
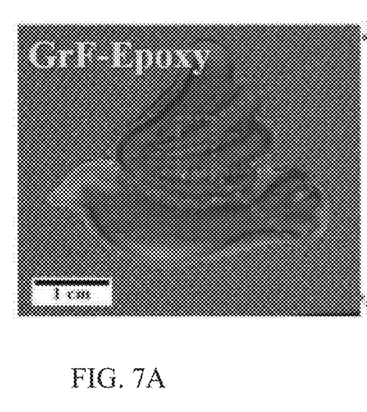
FIGS. 7A-7C show photographs of: molded biomimetic SMEP-GrF according to an embodiment of the invention (FIG. 7A); an enlargement of the photograph showing cracks of a damaged portion at room temperature (FIG. 7B); and an enlargement of the damaged portion after annealing the SMEP-GrF at a temperature above the $T_g$ of the SMEP to demonstrate self-healing of the SMEP-GrF (FIG. 7C).
Figure 7B:
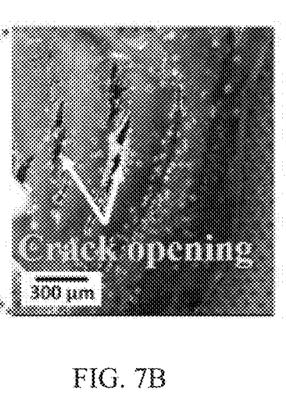
Figure 7C:
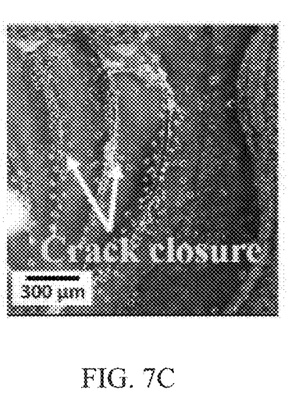

The enhanced shape recovery behavior of the SMEP-GrF, shown in FIG. 3B, over the unfilled SMEP, shown in FIG. 3A, allows macroscale deformation to recover upon heating. The recovery of the deformed samples of FIGS. 3A and 3B was induced by direct heating by placement of the sample on a preheated hot plate. As plotted in FIG. 4, the SMEP-GrF, and obvious from the t=25 s image in FIGS. 3A and 3B, a 23% improvement in recovery rate over the SMEP is provided with only a 0.75 wt % GrF framework. The shape memory does not depend on the heat source, as indicated in FIGS. 5A and 5B, where hot air was used as the heating source. The seal-healing capacity of the SMEP-GrF is illustrated in FIG. 6, where cracks in excess of 70 μm are healed upon warming above the Tg of the SMEP.

The addition of GrF transforms an electrically non-conductive SMEP to a highly electro-thermal conductive polymer composite. As shown in FIG. 6A, a small input current of 400 mA in the SMEP displays no electrical conduction and hence no resistive temperature increase, hence, no current induced shape recovery. In contrast, a SMEP-GrF, according to an embodiment of the invention, induces heating at a rate proportional to the current at 200 mA and 400 mA, as shown in FIGS. 6B and 6C. Hence the use of a SMEP-GrF allows shape memory and self-healing by applying a low current to the electrically conductive composite.

The SMEP-GrF also displays mechanical properties that are superior to the unfilled SMEP. For example, for the SMEP-GrF illustrated in FIGS. 6B and 6C, it displays an elastic modulus and a tensile strength increase by 20% and 6%, respectively, over the SMEP with only 0.75% GrF in the composite.

In an embodiment of the invention, a method to prepare the SMEP-GrF involves the infusion of a GrF framework with a fluid containing an epoxy precursor and an amine hardener precursor, referred herein as an epoxy resin and a hardener, respectively, after mixing these components, generally, but not necessarily, immediately after mixing. The liquid can contain additional particles (e.g., microparticles and/or nanoparticles) that are small relative to the cells of the GrF framework. Microparticles or nanoparticles, such as fullerenes, graphene platelets, metal oxide particles, metal particles, polymeric particles, any combination thereof or any other particle can be included. The liquid can be infused at ambient temperature or an elevated temperature. The GrF can be infused with the displacement of air or any other gas in the cells of the GrF. The GrF can be placed under vacuum before and during infusion of the epoxy resin and hardener. A device can be prepared from one GrF foam that defines the geometry of the device or the device can be formed from an ensemble of pieces of foam that are of dimensions that permit percolation of foam throughout at least a portion of the SMEP matrix. The percolating GrF foam portions can be included randomly or can be specifically combined where complementary surfaces of complementary shaped pieces are contacted or otherwise joined together.

In embodiments of the invention, thermally and electrically actuated SMEP-GrF composites can be fabricated as light-weight seal-healing devices that are components of structures that can be subjected to surface damages and cracks during typical use. Aircraft components, such as, but not limited to, reconfigurable rotor blades, spoilers, and ailerons with high strength and flexibility can be fabricated from SMEP-GrFs, according to an embodiment of the invention. The traditional devices experience internal and surface cracks that limit the aerodynamic performance of the aircraft. These traditional components can be replaced by light-weight, flexible, self-healing SMEP-GrFs, according to an embodiment of the invention. The SMEP-GrF comprising devices, according to an embodiment of the invention, have potential applications in deployable solar arrays structures or any morphing structures undergoing multiple cycles.

Methods and Materials

Free-standing GrF was received from Graphene Supermarket (Calverton, N.Y., USA). The epoxy resins (Diglycidyl ether of bisphenol A epoxy monomer (DGEBA, EPON 826) ($M_w$=340 g mol$^1$), and Neopentyl glycol diglycidyl ether (NGDE) ($M_w$=216 g mol$^1$) were obtained from Hexion Specialty Chemicals (Columbus, Ohio, USA) and Sigma-Aldrich (St. Louis, Mo., USA), respectively. Curing agent poly(propylene glycol)bis(2-aminopropyl) ether (Jeffamine D230) ($M_w$=230 g mol$^1$) were purchased from Huntsman (Woodlands, Tex., USA).

Field-emission scanning electron microscope (FE-SEM JEOL JSM-6330F, JEOL Ltd. Tokyo, Japan) was employed to inspect the GrF cell structure and the fractured SMEP-GrF samples. The electrical conductivity of SMEP-GrF and SMEP was evaluated using a DC four-point-probe method with a Keithly 2401 digital multimeter at room temperature and pressure. A T450 sc thermal imaging camera from FLIR was employed for thermal studies.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A shape-memory epoxy polymer graphene foam composite (SMEP-GrF), comprising:
   an open cell graphene foam (GrF) surrounded by and infiltrated with a shape-memory epoxy polymer (SMEP) matrix; and
   a filler comprising particles that are microparticles, nanoparticles, or a combination thereof,
   the particles of the filler comprising fullerenes, graphene platelets, metal oxide particles, polymeric particles, or any combination thereof,
   the GrF being an intra-connected framework within at least a portion of the SMEP matrix,
   the SMEP-GrF being self-healing,
   the self-healing of the SMEP-GrF being thermally actuated and accelerated,
   the SMEP-GrF being configured such that the self-healing is triggered by electrical actuation,
   the SMEP comprising an epoxy resin, and
   the epoxy resin comprising: diglycidyl ethers of: resorcinol; hydroquinone; 4,4'-isopropylidene bisphenol (bisphenol A); bis(4-hydroxyphenyl)-2,2-dichloroethylene (bisphenol C); bis(4-hydroxy-phenyl)methane (bisphenol F); 4,4'-sulfonyldiphenol (bisphenol S); 4,4'-dihydroxybiphenyl, 4,4'-dihydroxybenzophenone (bisphenol K); 4,4'-(9-fluorenylidene)-diphenol; 9,9-bis[4-(2-hydroxyethoxy)phenyl]fluorene: 4,4'-dihydroxydiphenylethylmethane; 3,3'-dihydroxydiphenyldiethyl-methane; 3,4'-dihydroxydiphenylmethylpropylmethane; 4,4'-dihydroxydiphenyloxide; 4,4'-dihydroxy-diphenylcyanomethane; 4,4'-dihydroxydiphenyl sulfide; 2,6-dihydroxynaphthalene; 1,3-dihydroxynaphthalene; 1,5-dihydroxynaphthalene; 1,6-dihydroxynaphthalene; 1,7-dihydroxynaphthalene; 2,7-dihydroxynaphthalene; catechol; 1,4-butanediol; 1,4-cyclohexanedimethanol; 1,2-cyclohexanedimethanol; 1,6-hexanediol; neopentylglycol; ethylene glycol; or combinations thereof,
   the GrF being from 0.1 to 1 wt % of the SMEP-GrF,
   cells of the open cell GrF having cross-sections that are larger than those of the particles of the filler, such that the particles of the filler are filled in the cells of the open cell GrF, and
   the filler residing throughout the entire SMEP matrix.

2. The SMEP-GrF according to claim 1, the SMEP having a glass transition temperature ($T_g$) in a range of from 70° C. to 180° C.

3. The SMEP-GrF according to claim 1, the SMEP-GrF being electrically conductive and thermally conductive.

4. A device, comprising the SMEP-GrF according to claim 1,
   the device being a reconfigurable rotor blade, spoiler, or aileron.

5. The SMEP-GrF according to claim 1, the particles of the filler comprising fullerenes.

6. The SMEP-GrF according to claim 1, the SMEP further comprising a hardener, and
   the hardener comprising: 2-amino-3-picoline; 2-amino-6-picoline; 2-aminopyridine; 3-aminopyridine; 4-aminophenol; 2-aminothiazole; 8-aminoquinoline; 8-naphthylamine; ethanolamine; o-anisidine; 2-(2-aminoethoxy)ethanol; benzylamine; propylamine; piperazine; 2-(methylamido)piperazine; 2-methylpiperazine; 2,5-dimethylpiperazine; 2,6-dimethylpiperazine; aniline; 4-(methylamido)aniline; 4-methoxyaniline (p-anisidine); 3-methoxyaniline (m-anisidine); 2-methoxyaniline (o-anisidine); 4-butylaniline; 2-sec-butylaniline; 2-tert-butylaniline; 4-sec-butylaniline; 4-tert-butylaniline; 5-tert-butyl-2-methoxyaniline; 3,4-methoxyaniline; 3,4-dimethylaniline; propylamine; butylamine; tert-butylamine; sec-butylamine; benzylamine; 2-aminoethanol and 1-aminopropan-2-ol; 1,4-bis(methylamino)benzene; 1,2-bis(methylamino)ethane; and N,N'-bis(2-hydroxyethyl)ethylene-diamine; N,N'-dibenzylethylenediamine; 2-aminobenothiazole; 3-amino-5-methylpyrazole; 2-amino-6-methylpyridine; 3-aminophenol; 2-amino-3-picoline; 4-aminopyridine; 3-aminopyridine; 2-aminopyridine; 3-aminoquinoline; 5-aminoquinoline; 2-aminothiophenol; tris(2,3-epoxy-propyl)isocyanurate; glycerol propoxylate triglycidyl ether; 3,5-diethyltoluene-2,4-diamine; 3,5-diethyltoluene-2,6-diamine; methylenedianiline; diethylenetriamine; tris(2-aminoethyl)-amine; or combinations thereof.

7. The SMEP-GrF according to claim 6, the hardener comprising a multifunctional cross-linking agent, and
   the multifunctional cross-linking agent comprising tris(2,3-epoxy-propyl)isocyanurate, glycerol propoxylate triglycidyl ether, 3,5-diethyltoluene-2,4-diamine and 3,5-diethyltoluene-2,6-diamine, methylenedianiline, diethylenetriamine, tris(2-aminoethyl)-amine, or a combination thereof.

8. The SMEP-GrF according to claim 1, the epoxy resin comprising: diglycidyl ethers of: resorcinol; hydroquinone; 4,4'-(9-fluorenylidene)-diphenol; 9,9-bis[4-(2-hydroxyethoxy)phenyl]fluorene: 4,4'-dihydroxydiphenylethylmethane; 3,3'-dihydroxydiphenyldiethyl-methane; 3,4'-dihydroxydiphenylmethylpropylmethane; 4,4'-dihydroxydiphenyloxide; 4,4'-dihydroxy-diphenylcyanomethane; 4,4'-dihydroxydiphenyl sulfide; 2,6-dihydroxynaphthalene; 1,3-dihydroxynaphthalene; 1,5-dihydroxynaphthalene; 1,6-dihydroxynaphthalene; 1,7-dihydroxynaphthalene; 2,7-dihydroxynaphthalene; catechol; 1,4-butanediol; 1,4-cyclohexanedimethanol; 1,2-cyclohexanedimethanol; 1,6-hexanediol; neopentylglycol; ethylene glycol; or combinations thereof.

9. A shape-memory epoxy polymer graphene foam composite (SMEP-GrF), comprising:
   an open cell graphene foam (GrF) surrounded by and infiltrated with a shape-memory epoxy polymer (SMEP) matrix; and
   a filler comprising particles that are microparticles, nanoparticles, or a combination thereof, cells of the open cell GrF having cross-sections that are larger than those of the particles of the filler, such that the particles of the filler are filled in the cells of the open cell GrF, the GrF being an intra-connected framework within at least a portion of the SMEP matrix, the GrF being from 0.1 to 1 wt % of the SMEP-GrF, the SMEP having a glass transition temperature ($T_g$) in a range of from 70° C. to 180° C., the SMEP-GrF being self-healing, the SMEP-GrF being electrically conductive and thermally conductive, the particles of the filler comprising fullerenes, graphene platelets, metal oxide particles, polymeric particles, or any combination thereof, and the self-healing of the SMEP-GrF being thermally actuated and accelerated, the SMEP-GrF being configured such that the self-healing is triggered by electrical actuation, the SMEP comprising an epoxy resin, the epoxy resin comprising: diglycidyl ethers of: resorcinol; hydroquinone; 4,4'-isopropylidene bisphenol (bisphenol A); bis(4-hydroxyphenyl)-2,2-dichloroethylene (bisphenol C); bis(4-hydroxy-phenyl)methane (bisphenol F); 4,4'-sulfonyldiphenol (bisphenol S); 4,4'-dihydroxybiphenyl, 4,4'-dihydroxybenzophenone (bisphenol K); 4,4'-(9-fluorenylidene)-diphenol; 9,9-bis[4-(2-hydroxyethoxy)phenyl]fluorene: 4,4'-dihydroxydiphenylethylmethane; 3,3'-dihydroxydiphenyldiethyl-methane; 3,4'-dihydroxydiphenylmethylpropylmethane; 4,4'-dihydroxydiphenyloxide; 4,4'-dihydroxy-diphenylcyanomethane; 4,4'-dihydroxydiphenyl sulfide; 2,6-dihydroxynaphthalene; 1,3-dihydroxynaphthalene; 1,5-dihydroxynaphthalene; 1,6-dihydroxynaphthalene; 1,7-dihydroxynaphthalene; 2,7-dihydroxynaphthalene; catechol; 1,4-butanediol; 1,4-cyclohexanedimethanol; 1,2-cyclohexanedimethanol; 1,6-hexanediol; neopentylglycol; ethylene glycol; or combinations thereof, and the filler residing throughout the entire SMEP matrix.

10. The SMEP-GrF according to claim 9, the particles of the filler comprising fullerenes.

11. The SMEP-GrF according to claim 9, the SMEP further comprising a hardener, and the hardener comprising: 2-amino-3-picoline; 2-amino-6-picoline; 2-aminopyridine; 3-aminopyridine; 4-aminophenol; 2-aminothiazole; 8-aminoquinoline; 8-naphthylamine; ethanolamine; o-anisidine; 2-(2-aminoethoxy)ethanol; benzylamine; propylamine; piperazine; 2-(methylamido)piperazine; 2-methylpiperazine; 2,5-dimethylpiperazine; 2,6-dimethylpiperazine; aniline; 4-(methylamido)aniline; 4-methoxyaniline (p-anisidine); 3-methoxyaniline (m-anisidine); 2-methoxyaniline (o-anisidine); 4-butylaniline; 2-sec-butylaniline; 2-tert-butylaniline; 4-sec-butylaniline; 4-tert-butylaniline; 5-tert-butyl-2-methoxyaniline; 3,4-methoxyaniline; 3,4-dimethylaniline; propylamine; butylamine; tert-butylamine; sec-butylamine; benzylamine; 2-aminoethanol and 1-aminopropan-2-ol; 1,4-bis(methylamino)benzene; 1,2-bis(methylamino)ethane; and N,N'-bis(2-hydroxyethyl)ethylene-diamine; N,N'-dibenzylethylenediamine; 2-aminobenothiazole; 3-amino-5-methylpyrazole; 2-amino-6-methylpyridine; 3-aminophenol; 2-amino-3-picoline; 4-aminopyridine; 3-aminopyridine; 2-aminopyridine; 3-aminoquinoline; 5-aminoquinoline; 2-aminothiophenol; tris(2,3-epoxy-propyl)isocyanurate; glycerol propoxylate triglycidyl ether; 3,5-diethyltoluene-2,4-diamine; 3,5-diethyltoluene-2,6-diamine; methylenedianiline; diethylenetriamine; tris(2-aminoethyl)-amine; or combinations thereof.

12. The SMEP-GrF according to claim 11, the hardener comprising a multifunctional cross-linking agent, and the multifunctional cross-linking agent comprising tris(2, 3-epoxy-propyl)isocyanurate, glycerol propoxylate triglycidyl ether, 3,5-diethyltoluene-2,4-diamine and 3,5-diethyltoluene-2,6-diamine, methylenedianiline, diethylenetriamine, tris(2-aminoethyl)-amine, or a combination thereof.

\* \* \* \* \*